United States Patent [19]
Schwarzbach et al.

[11] 3,789,708
[45] Feb. 5, 1974

[54] THREAD CUTTING DEVICE

[75] Inventors: Peter H. Schwarzbach, San Pablo; Robert L. Perrin, Martinez, both of Calif.

[73] Assignee: Ernest H. McCoy, Berkeley, Calif.; a part interest

[22] Filed: Oct. 18, 1971

[21] Appl. No.: 189,934

[52] U.S. Cl. ............................................... 82/5.5
[51] Int. Cl. ............................................. B23b 5/46
[58] Field of Search ............................... 82/5.5, 5

[56] References Cited
UNITED STATES PATENTS

| | | | |
|---|---|---|---|
| 3,102,445 | 9/1963 | Elledge | 82/5.5 X |
| 3,178,972 | 4/1965 | Beebee | 82/5 |
| 191,894 | 6/1877 | Stetson | 82/5 |

FOREIGN PATENTS OR APPLICATIONS

| | | | |
|---|---|---|---|
| 6,687 | 0/1893 | Great Britain | 82/5.5 |
| 1,147,102 | 4/1963 | Germany | 82/5 |

*Primary Examiner*—Leonidas Vlachos
*Attorney, Agent, or Firm*—Bruce & McCoy

[57] ABSTRACT

A thread cutting device for attachment to a lathe comprising a frame supporting a rotatable and slidable head and means for moving the head with controlled movement along a workpiece mounted in the lathe. The head includes a cutting tool which can be rotated into and out of engagement with the workpiece for forming threads thereon.

7 Claims, 5 Drawing Figures

INVENTORS
ROBERT L. PERRIN
PETER H. SCHWARZBACH
BY Bruce & McCoy
ATTORNEYS

Patented Feb. 5, 1974
3,789,708
3 Sheets-Sheet 3
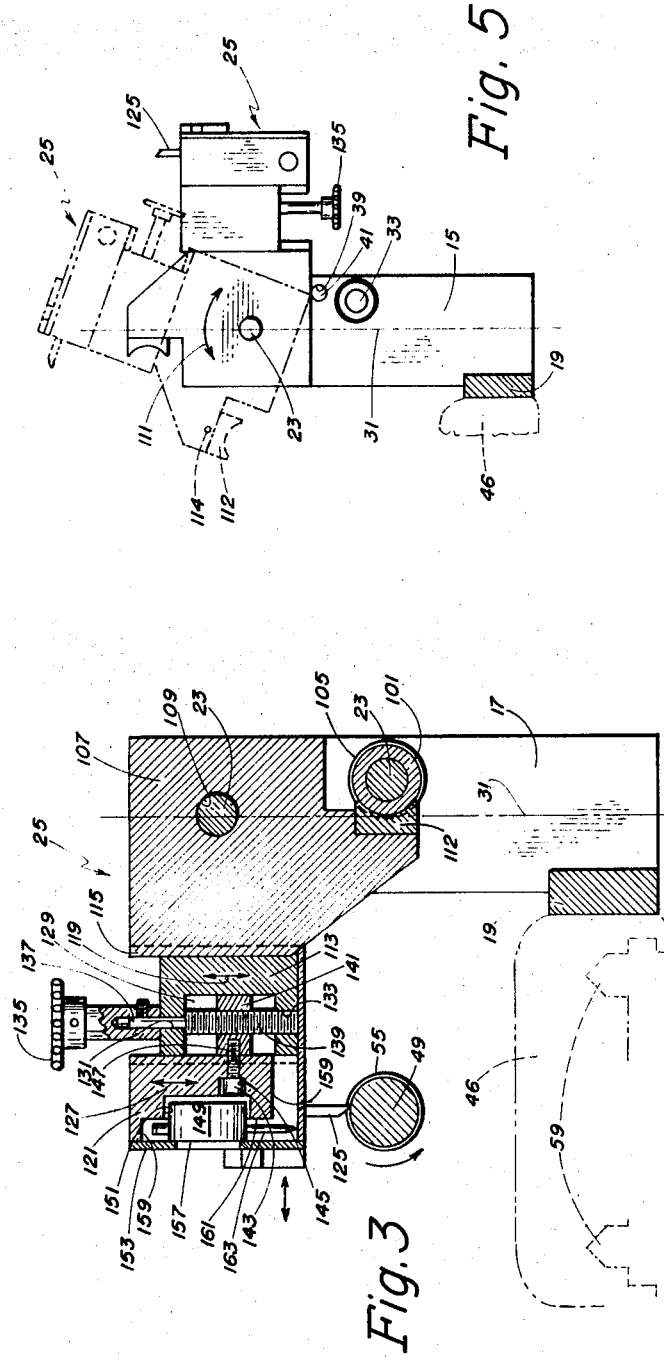
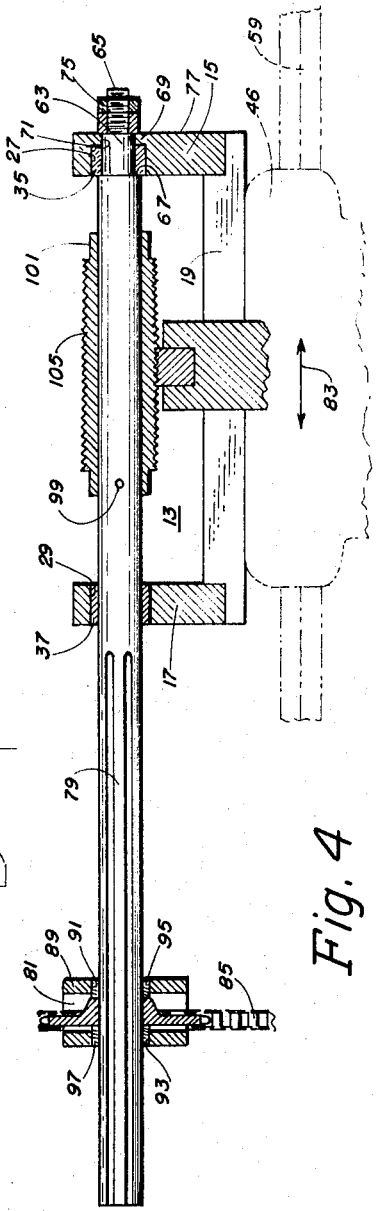
INVENTORS
ROBERT L. PERRIN
PETER H. SCHWARZBACH
BY Bruce E. McCoy
ATTORNEYS

THREAD CUTTING DEVICE

BACKGROUND OF THE INVENTION

1. Field of the Invention

The present invention relates generally to thread cutting devices, and more particularly to a thread cutting attachment for mounting on the carriage of a lathe and which may be rotated into and out of contact with the workpiece for forming a thread thereon.

2. Description of the Prior Art

Standard metal machining lathes are usually adapted for cutting screw threads by either feeding the carriage, holding the cutting tool, along the bed of the lathe at a controlled rate or by mounting on the lathe a geometric head which fits over the workpiece.

Most latches are provided with separate feed and speed adjustments for the carriage of the lathe to permit a cutting tool mounted on the carriage to form threads on a workpiece held by the lathe. In known screw-cutting lathes, the power feed of the tool into and along the workpiece must be in proportion to the number of threads per inch to be cut thereon. The carriage of the lathe is usually moved along the bed of the lathe by means of a lead screw which is normally positively driven by a series of gears from the head stock spindle. The feed rod, or means of moving the cutting tool into the workpiece, may be driven from the head stock spindle by a number of means.

In machining threads of different pitches and diameters on the same lathe, much time is wasted in setup and trail cuts. In some situations, special tooling must be utilized. When a machinist is required to make both standard and special threads using the same machine, much time is wasted in adjusting the lathe to the different requirements. Furthermore, separate sets of dies for each different pitch and diameter are required, and to insure that a precision thread is cut, the speed and feed of the cutting tool must be accurately determined for each. Moreover, when a thread of high quality is to be cut on a lathe, the setup time, low cutting speeds, and the necessity of watching the thread dial, place a high time cost on the operation.

In lathes used only as thread cutting machines, a geometric head may be utilized which fits over the workpiece to cut the thread. However, geometric heads require proper alignment, are expensive to purchase and maintain, and are limited as to the size and pitch of the thread which can be cut.

Many tables are available which show the optimum cutting speeds to be used with the different types of thread forming tools, such as single pointed threading tools, threading chasers, taps, dies, threading mills, thread rolling machines, and by grinding. These tables show that, for a given material, utilizing a given threading tool for cutting the threads, threading machines and lathes must observe definite speed limitations in order to insure obtaining a given quality thread.

The instant invention, however, does not utilize any of the known means of cutting threads other than the use of a single pointed threaded tool, and it is believed to comprise a new and unique method and apparatus for cutting of threads at much higher speeds than available in the prior art with considerably less setup time.

SUMMARY OF THE INVENTION

The present invention comprises a thread cutting device having a frame for attachment to the carriage of a lathe and includes at least one shaft supported in the frame with a rotatable and slidable head for supporting a cutting tool mounted on the shaft so as to be capable of moving along and being rotatable with respect to the shaft whereby the cutting tool can be rotated into contact with a rotating workpiece mounted on the lathe and means for controlling movement of said head along the shaft to cut threads on the workpiece.

OBJECTS OF THE INVENTION

It is therefore an important object of the present invention to provide a thread cutting machine which cuts cost and time wasted by setup and trial cuts.

It is another object of the invention to provide a thread cutting machine which eliminates the need of separate dies for cutting threads of different pitches and diameters.

It is a further object of this invention to provide a thread cutting machine which cuts a high quality thread on a lathe in a reduced period of time at high cutting speeds.

It is a further object of the instant invention to provide a thread cutting machine which may be easily attached and removed from a known shop lathe by merely bolting the attachment to the carriage of the lathe.

It is still another object of the present invention to provide a thread cutting attachment which is driven at lathe speed from the head stock spindle without reducing machine speeds when cutting threads.

It is yet another object of the invention to provide a thread cutting attachment for mounting on a lathe which will provide a clean and precise thread, automatic engagement of the cutting tool with the workpiece, and an easily controlled means of determining the depth of the thread which is cut.

And it is a still further object of the instant invention to provide a thread cutting attachment for mounting on a lathe which contains quick change means to enable different thread pitches to be cut, as desired.

BRIEF DESCRIPTION OF THE DRAWINGS

Other objects and advantages of the invention will be obvious from the following description of the drawings wherein:

FIG. 3 shows a cross-section of the device taken along the line 3—3 of FIG. 2;

FIG. 4 shows a cross-section of the device taken along line 4—4 of FIG. 2; and

FIG. 5 shows, in solid lines, the cutting head of the instant invention in the non-operative position resting on its stop and, in phantom line, the head of the instant invention as it is rotated toward its operative position.

DESCRIPTION OF THE PREFERRED EMBODIMENT

Figure 1:
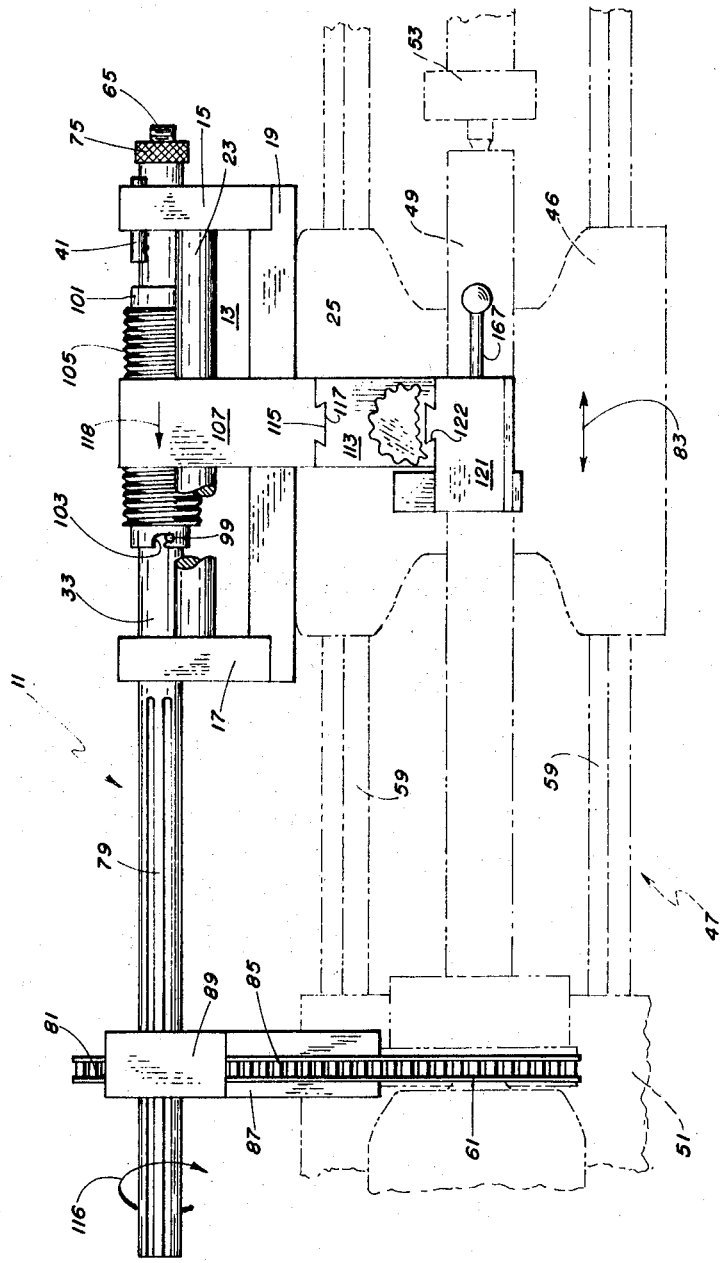
FIG. 1 shows a top plan view of the preferred embodiment of the present invention mounted at the rear of the carriage of a lathe to form a thread on a workpiece carried by the lathe.

Turning now to the drawings, there shown is a preferred embodiment of applicant's present invention wherein a thread cutting attachment 11 is mounted on the back of the movable carriage 46 of a lathe. The driving means for this thread cutting attachment is connected to the head stock spindle of the lathe, whereby, upon rotation of the head stock spindle, the thread cutting attachment may be operated.

The novel thread cutting means of the instant invention includes a threaded bearing block 112 mounted on a rotatable cutting head 25 which, when rotated into contact with a rotating collar 101 having threads 105 formed thereon, mechanically driven by the head stock spindle, coacts with the collar to move the cutting head along a fixed shaft 23 in the horizontal direction. The cutting head includes a cutting tool 125 adjustably mounted thereon so that upon contact with a workpiece 49 the cutting tool may be adjusted to cut a thread of the necessary depth, in the required number of passes, to achieve a finished thread depending on the speed of the lathe and the type of material being threaded.

By utilizing the novel thread cutting attachment of the instant invention, accurate and smooth threads may be quickly and easily formed on a workpiece of any size, at much higher speeds than in any known thread cutting machine.

As shown in the attached drawings, the thread cutting attachment 11 includes a frame 113 having right and left side plates 15,17 and a front cross-bar or interconnecting plate 19. The connecting plate is secured at the bottom of the two side plates, by any suitable means, such as bolts 21 shown in FIG. 2. These side and connecting plates may be made of any suitable high-strength material and in the preferred embodiment shown are preferably made of lightweight, polished aluminum or steel for both durability and aesthetic purposes.

Each of the side plates 15, 17 is provided with a bore (not shown), formed in any suitable manner, at the top central portion thereof in alignment with a bore (not shown) formed in the other side plate. A smoothly finished shaft 23, made, for example, from machine steel, is fixedly held or journalled within the pair of aligned bores, such as by force fitting. The shaft 23 carries a cutting head 25, more fully described hereinafter, rotatably and slidably mounted thereon.

The side plates also include a further pair of aligned bores 27, 29 formed therein (see FIG. 4). The aligned bores 27, 29 are formed below the first pair of bores and are offset from the center lines 31 of the side plates (see FIGS. 3 and 5) passing through the first pair of bores. A second or rotatable shaft 33 is journalled within a pair of bearings 35,37 held within the lower pair of aligned bores 27,29.

One of the side plates, preferably the right side plate 15, is provided with a further bore 39 formed above and substantially aligned with the bore 27 thereof. The bore 39 removably carries a slidable pin or stop 41 upon which the rotatable cutting head 25 may rest in its non-operative position, as shown in phantom line in FIG. 2 and in solid line in FIG. 5.

Figure 2:
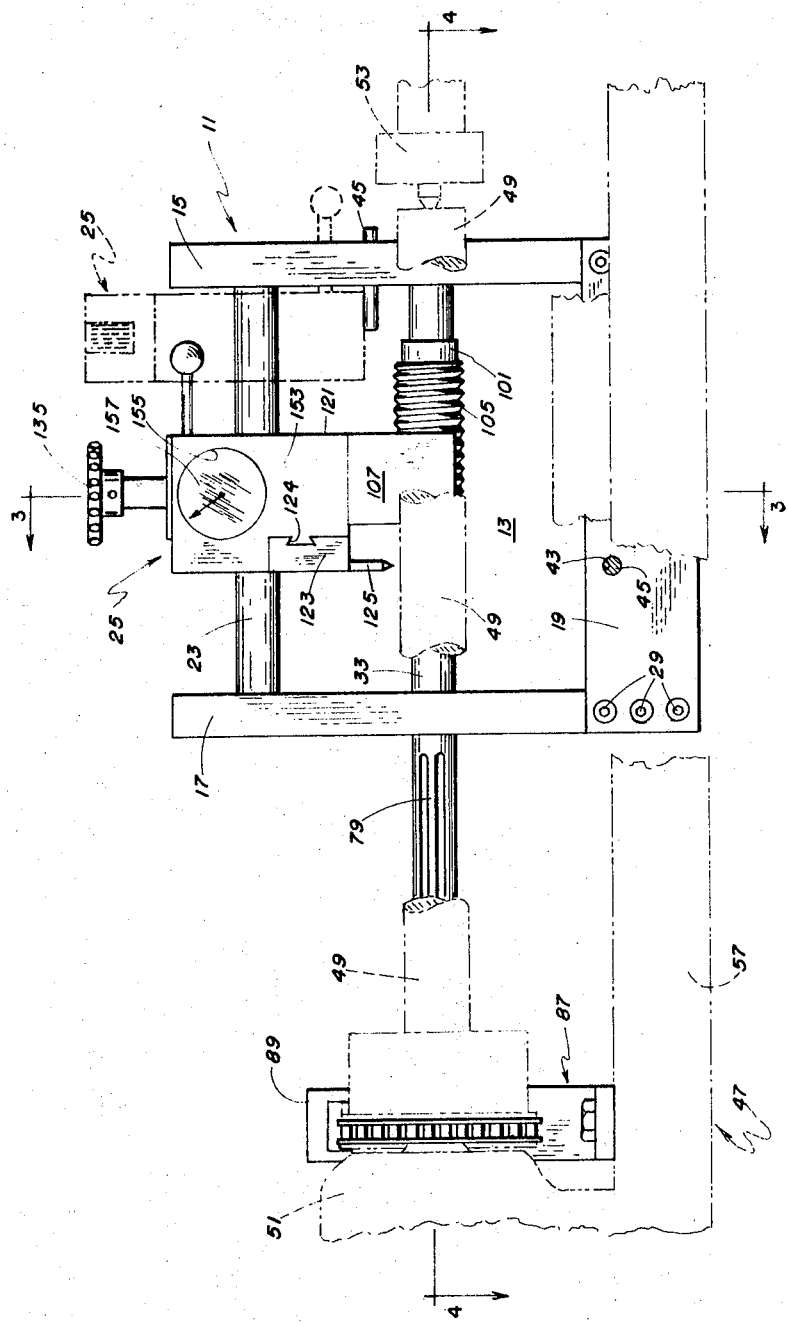
FIG. 2 shows a side elevational view of the preferred embodiment of the invention shown in FIG. 1 with only portions of the workpiece being shown.

The cross or interconnecting plate 19 is provided with a pattern of holes 43 formed therein. As indicated in FIG. 2, two holes 43 (only one of which is shown) spaced apart a predetermined distance, are formed in the cross plate. The holes 43 enable the frame 13 to be attached with two bolts 45 (one of which is shown), at the back of a carriage 46 of a lathe 47 opposite the cross feed (not shown), in taper attachment holes (not shown). The taper attachment holes are usually bored and tapped in a lathe at the factory. This enables the frame 13 to be easily mounted and aligned on any given lathe in a short period of time in a position where it does not interfere with the normal machining use of the lathe.

The lathe 47, shown in phantom line, carries a workpiece 49 between centers on the head stock 51 and the tail stock 53 upon which a thread, such as 55 is to be cut. It is to be understood that the workpiece may be held by any other suitable means such as a chuck, and may be of any diameter. The maximum diameter of the workpiece to be threaded is limited only by the design of a given lathe. Furthermore, a workpiece having a single diameter or several different diameter portions, tapered portions, or the like, may be quickly threaded by the attachment of the instant invention.

The lathe 47 includes a bed 57 having slide bars 59 upon which the movable carriage 46 slides. The lathe includes driving means connected to the head stock spindle (not shown). A gear 61, or the like, may be attached to the head stock or may be formed integrally with a chuck spindle to provide the necessary power for operating the thread cutting attachment, as explained more clearly hereinafter.

The rotatable shaft 33 journalled within the bearings 35, 37 includes a reduced end portion 63 having a threaded portion 65, as shown in FIG. 4. An end face 67 is formed between the rotatable shaft 33 and the reduced end portion 63. The reduced end portion 63 is carried in the bearing 35 held in the bore 27, preferably formed as a counter bore extending into a wall 69. A reduced diameter bore 71 is formed in the wall 69 and the threaded portion 65 extends therethrough. The end face 67 formed between the reduced end portion 63 and the rotatable shaft 33 is normally held against lateral movement in one direction by coaction with an end 73 of the bearing 35. To insure that there is no unnecessary lateral movement, a lock nut 75, preferably knurled, is threaded over the threaded portion 65 and coacts with the outside wall 77 of the side plate 15 to hold the face 67 in contact with the end of the bearing.

The other end portion 79 of the rotatable shaft, outside of the frame 13, distant from the reduced end 63 is provided wih splines, by forming in any convenient manner. The splined end portion 79 carries a driven gear 81 slidably mounted thereon and rotatable therewith.

The driven gear 81 is connected to the driving gear 61 mounted on the head stock 51 by any suitable drive means, such as the chain drive 85 shown, or any other desired mechanical power transmission means may be utilized. A support 87 is provided for the splined end 79 of the shaft. The support 87 is removably fixed to the slide bar at the back of the lathe and preferably includes a vertically extending housing portion 89 substantially surrounding the driven gear 81. The housing portion 89 contains a pair of aligned openings 91,93 in which the splined end portion 79 is supported. The housing 89 further coacts with the driven gear 81 to hold this gear against lateral movement when the carriage 46 of the lathe, together with the frame and the splined end 79 are moved in the horizontal direction as indicated by the arrow 83 (see FIGS. 1 and 4).

The portion of the rotatable shaft between the interior surfaces of the side plates is provided with a bore wherein a roll pin 99, or the like, may be inserted. The pin 99 holds the end of a removable or quick-change collar 101 in position. As shown in FIG. 1, the collar 101 has an offset bayonet type connection of opening 103 formed therein. The removable collar may be slipped over the threaded end of the rotatable shaft until the pin 99 slips into the opening 103 and the collar is then turned to lock the collar to the rotatable shaft for rotation therewith.

The exterior portion of the collar has an exterior thread 105 formed thereon, of any desired pitch, such as by machining on any type of thread cutting machine. The thread 105 forms a thread pattern the pitch of which is to be copied on a workpiece and should be of high precision to provide long life and high quality threads. The collar may be made from any suitable material, but in the preferred embodiment shown is made from bronze for durability and smooth operation. Different collars having different thread pitches, forming different patterns to be copied, are easily and quickly interchangeable by merely unscrewing the knurled lock nut 75, sliding the rotatable shaft 33 out of the frame in the direction away from the lock nut, turning the collar so as to loosen the same from the pin, and slipping the collar off the threaded end of the rotatable shaft. A new collar, also preferably made from bronze, having a different thread pitch may then be inserted on the rotatable shaft and the shaft may be resecured in the frame.

Turning now to FIG. 3, the cutting head 25, rotatably and slidably mounted on the fixed shaft 23, is shown comprising a main block 107 having a bore 109 formed therein for mounting on the fixed shaft 23. The size of the bore 109 and the size of the shaft are chosen so that the block 107 may be easily slid over and rotated about the fixed shaft. However, the size of the hole and the size of the shaft must be closely correlated to insure that no unnecessary sloppiness or play is allowed. This enables the cutting head to consistently form a high quality thread on a workpiece.

The main block 107 is slidable in the horizontal direction, along the shaft 23, between the side plates 15, 17 and rotatable in the vertical direction, with respect to the shaft 23, as shown by the arrow 111 in FIG. 5. A bearing block 112 is removably attached at the lower rear portion of the main block 107 by means of a pin 114. This bearing block is provided with a thread pattern identical with the thread pattern 105 formed on the collar to coact therewith when they are rotated into contact. When the collar 101 is removed and a collar having a different pitch put in its place, a different bearing block, having a thread pattern which is identical to the thread pattern formed on the new collar is also provided in the main block. The pin 114 is merely removed, the old bearing block slipped out and a new bearing block locked in the same position.

The operation of the threading attachment will now be partially described for reasons of clarity. When the lathe 47 is started, the workpiece 49 held thereon will be caused to rotate in the direction of the arrow (FIG. 3). At the same time, due to the attachment of the driving gear 61 to the head stock spindle, the driving gear 61 will be rotated at the same speed as the workpiece 49, i.e., the speed of the lathe. The driving gear 61 will in turn rotate the driven gear 81, via the chain drive 85, at substantially the same speed (depending on the number of teeth on each gear). In the preferred embodiment shown, the gears 61, 81 have the same number of teeth so as to turn at the same speed. Rotation of the driven gear 81 causes rotation of the rotatable shaft 33 and the attached collar 101 due to the splined end portion 79 held within the driven gear, in the direction of the arrow 116 (FIG. 1).

While the shaft 33 and collar 101 are rotating, the threaded pattern of the bearing block 112 is brought into contact with the threaded portion 105. This causes the bearing block and therefore the entire head 25 to be moved in the horizontal direction, shown by the arrow 118 in FIG. 1.

Returning now to the description of the preferred embodiment, the complete operation of the thread cutting attachment of this invention will be more clearly brought out.

A central block 113 is slidably mounted on the main block 107 by means, for example, of dovetailed sections 115, 117 formed on the blocks (see FIGS. 1 and 3). The central block is movable in the vertical direction with respect to the main block, as shown by the arrow 119. The central block may be fixedly held in position with respect to the main block 107, in any suitable manner, such as by a threaded set screw extending through the side of the central block 113 for contact with the dovetailed slide 115 formed on the main block.

A cutting block 121 is slidably mounted on the central block 113 by a further slide and groove arrangement 112 at the opposite end from the end of the central block mounted on the main block 107. The cutting block 121 carries an insertable tool holding section 123 on a slide 124 formed on the cutting block 121 at the front thereof (FIG. 2). The insertable tool holding section is provided with a groove 126 fitting over the slide 124 and preferably carries a single pointed threading tool 125, in any suitable manner, such as by set screws, whereby the cutting tool may be replaced when worn or when a different type of tool is required.

The cutting block 121 is movable in the vertical direction with respect to the central block 113 and the main block 107, as shown by the arrow 127. This vertical movement may be accomplished in any convenient manner. However, in the preferred embodiment shown, the central block 113 is provided with a hollow chamber 129 having end bores 131, 133 formed therein. A lead screw having an adjusting knob 135 removably attached to the upper end 137 extends through the upper bore 131, while a threaded lower portion 139 extends through the lower bore 133. A movable, internally threaded nut 141 is mounted on the threaded portion 139 of the lead screw and is fixed against rotation in the chamber 129. A bolt 143 passing through a counter bored hole 145 formed in the cutting block, threadedly engages a tapped hole 147 formed in the threaded nut 141 for removably attaching the cutting block to the threaded nut 141.

When the threaded portion of the lead screw is turned by rotation of the knob 135, the nut 141 is moved either upwardly or downwardly on the threaded portion 139 in the vertical direction with respect to the central block and the main block. The movement of the threaded nut 141 carries the entire cutting block 121 in the same direction.

As shown more clearly in FIGS. 2 and 3, the cutting block 121 is provided with a thread depth indicator 149 held within the cutting block in a recessed cavity 151 formed therein. A cover plate 153 having a hole 155 is placed over the indicator 149 and holds the indicator in place while allowing a dial 157 thereof to be seen.

The cutting block 121 further includes horizontal and vertical slots 159,161 formed therein. A vertically extending stem 163 of the indicator is placed in the vertical slot 161, while the horizontal slot 159 is provided to allow the passage of a horizontally extending tongue 165. The tongue 165 is secured to the bottom of the central block 113, in any convenient manner, and extends into the slot 159 beyond the central block 113 in cantilever fashion. The other or free end of the tongue 165 acts against the stem 163 of the indicator. The indicator is initially set at the desired position, and when the cutting block 12 is moved in relation to the central block 113 the stem 163, acting against the free end of the tongue 165, is moved to thereby register on the indicator dial the relative movement of the cutting block 121 and therefore the cutting tool 125.

The rotatable cutting head 25 is provided with a handle 167 whereby the entire head may be rotated in the vertical direction as shown by the arrow 111 in FIG. 5. This handle may be mounted in any convenient position. However, as more clearly shown in FIG. 1, the handle 167 is preferably screwed into a tapped hole formed at the front of the cutting block 121. By being placed at the front of the cutting head, near the top thereof, a machinist, when using the thread cutting attachment of the instant invention, may more easily grasp the handle 167 for rotation of the head. Furthermore, a greater force may be applied to the cutting tool, due to the length of the moment arm provided by the positioning of the handle with respect to the shaft 23 about which it rotates.

When the lathe is in operation, the handle 167 is grasped by the machinist and the head 25 may be rotated into engagement with the workpiece 49 to cut the thread. Or the head may be rotated out of the operative position and against the stop 41 to enable the workpiece to be removed or the lathe to be used for other operations. The handle 167 may also be used to raise the head 25 in order that different diameters of the same workpiece may be threaded.

Preferably, after a workpiece is placed on the lathe, the threading tool 125 is brought into initial contact therewith by rotation of the head 25 with the handle 167. The cutting block 122 is then adjusted by the handle 135 until the bearing block 112 contacts the collar 101. The head 25 is then vertically rotated out of contact with the workpice and the initial depth of the thread to be cut on the first pass is adjusted by the knob 135. The lathe is started and the cutting tool 125 is brought into contact with the rotating workpiece while the bearing block 112 is simultaneously brought into contact with the rotating collar. The coaction of the bearing with the collar forces the head 25 in the direction of the arrow 118, thereby causing the threading tool to be moved along the workpiece and to form a thread thereon, having the same pitch as the thread pattern on the collar. The head is raised after it runs the length of the collar, is brought back to its starting position, and the knob 135 turned to adjust the cutting tool 125 to allow a further pass to be made on the workpiece. Any desired number of passes may be made, by merely repeating this procedure until a high-quality thread of the desired depth is obtained.

A long workpiece or selected portions of a workpiece may be threaded by the instant invention by merely moving the carriage 46 carrying the frame in either direction, as shown by the arrow 83, and bringing the cutting tool into contact with the workpiece. In addition, tapered collars, and left-hand or metric collars may be provided for cutting tapered, left-hand or metric threads. Also, by simply modifying the tool holder, an attachment for cutting inside threads may be obtained.

One of the important advantages of the instant invention is that the frame of the thread cutting attachment is quickly and easily attached to and removed from the carriage of any known lathe without the use of any special tools or the removal of any of the lathe's equipment other than a taper attachment if one is on the lathe. Furthermore, when in position, the threading attachment may be left on the lathe, and other operations may be performed by other cutting tools mounted on the lathe in the normal manner without interference from the thread cutting attachment.

By utilizing a splined shaft for rotating the collar of the instant invention, the collar and shaft are easily driven at the same speed as the workpiece by a mechanical power transmission connected to the chuck of the lathe. This enables a high quality thread to be consistently cut using much higher speeds than with thread cutting setups and standard lathes.

The thread cutting attachment of the instant invention has been designed for adaptation to the wide variety of lathes presently in use and greatly increases the speed of setup and cutting time, and eliminates the need for expensive special tooling and separate sets of dies and other attachments.

The cutting attachment of the instant invention is more versatile by permitting even metric threads to be cut by simply using a metric collar. The attachment does not tie up the lathe for threading purposes only and allows the lathe to be utilized much more economically.

The quick change thread collars slipped on and off the rotating shaft, together with the replaceable matching bearing blocks, allow different varieties of threads to be easily cut on a single lathe in a minimum of time without the required setup time and trial cuts now necessary with standard frame and dies.

The quick change collars are easily removable and may be slipped on and off the rotatable shaft, to provide a versatility and utility unknown in any existing threading attachment.

Due to the rotatable feature of the thread cutting head, into and out of engagement with the workpiece by merely raising a handle, workpieces having multiple diameters and odd shapes may be easily threaded, without any special steps or adjustments of the lathe.

The depth of the thread to be cut is also easily controlled by merely adjusting a rotatable knob and regarding an easily readable dial at the front of the cutting head.

It will be apparent from the foregoing description of the invention in its preferred form that it will fulfill all the objects attributable thereto, and while it is illustrated and described in detail, the invention it not to be limited to such details as have been set forth except as may be necessitated by the appended claims.

What is claimed is:

1. A thread cutting device for a lathe comprising
   a removable frame mounted on the back of the lathe's carriage, a support removably attached to said lathe bed, said support housing a driven gear mounted on a splined end portion of a rotatable shaft passing through said support, said rotatable shaft including a cylindrical portion journalled in said frame whereby as said carriage moves along said lathe bed, said shaft will reciprocate in said driven gear and still be driven by it, drive means interconnecting said driven gear and the head stock spindle of the lathe causing said driven gear to rotate when said spindle rotates, a collar removably attached to the circular portion of said rotatable shaft, said collar having a thread pattern formed thereon, a head having a cutting tool adjustably mounted therein, said head being rotatably and slidably mounted on a fixed shaft held within said frame, and a bearing block having a thread pattern formed thereon mounted in said head whereby upon rotation of said head, so as to bring said cutting tool into engagement with a workpiece mounted in said lathe, the thread pattern of said bearing block is brought into engagement with the thread pattern of said collar, and upon rotation of said workpiece by said head stock, said rotatable shaft and collar are rotated whereby said head and said cutting tool are moved along said fixed shaft by the coaction of said bearing block threads with the threads of said collar to form threads on a workpiece mounted in the lathe.

2. The thread cutting device of claim 1 wherein said splined shaft contains a removable holding means which coacts with said frame to retain said shaft in said frame and allows said splined shaft to be removed from said frame when said holding means is removed.

3. The thread cutting device of claim 1 wherein said movable head includes a handle being capable of being grasped by a machinist to rotate said head in a vertical plane into and out of engagement with said workpiece and said collar, and an adjusting knob rotatably mounted in said head and connected with said cutting tool whereby movement of said knob adjusts the vertical position of said cutting tool.

4. The thread cutting device of claim 3 wherein said head is provided with an indicating means for indicating the distance the thread cutting tool is projecting into the workpiece to thereby indicate the depth of the thread cut on said workpiece.

5. The thread cutting device of claim 4 wherein said frame is provided with a stop means for supporting said head in a removed rest position when said head is rotated out of its operative position and against said stop.

6. The thread cutting device of claim 1 wherein the drive means comprises a gear mounted on the head stock spindle and driven thereby and chain drive means connecting said head stock gear and said driven gear.

7. A thread cutting device for mounting on the carriage of a lathe to cut threads on a workpiece carried by the lathe, comprising a frame having at least two vertically projecting side plates interconnected by a front plate, said front plate having a hole pattern formed therein for mounting said device on the carriage of said lathe, two metal shafts journalled within said frame by said side plates, a first of said shafts being fixed against rotation and having a head rotatably and slidingly mounted thereon, said head being rotatable in a vertical plane around said shaft by means of a handle attached thereto, a cutting tool adjustably mounted in said head, said cutting tool being rotated into and out of engagement with said workpiece carried by said lathe upon rotation of said head, the second of said shafts being rotatably mounted in said side plates and having end portions extending beyond said side plates, one of said end portions being splined and having a driven gear slidably mounted thereon, said driven gear being driven by a chain drive capable of being connected to a second gear driven by the head stock spindle of the lathe, a removable holding means which coacts with said frame to retain said second shaft in said frame and allows said shaft to be removed from the frame when the holding means is removed, a collar removably attached to the circular portion of said rotatable shaft, said collar having a thread pattern formed thereon, a bearing block having a thread pattern formed thereon mounted in said head whereby upon rotation of said head in a vertical plane, so as to bring said cutting tool into engagement with a workpiece mounted in said lathe, the threaded portion of said bearing block is brought into engagement with the threaded portion of said collar, and upon rotation of said workpiece by said head stock, said rotatable shaft and collar are rotated whereby said head and said cutting tool are moved along said fixed shaft by the coaction of said bearing block threads with the threads of said collar to form threads on a workpiece mounted in the lathe, an adjusting knob rotatably mounted in said head and connected with said cutting tool whereby movement of said knob adjusts the vertical position of said cutting tool, and an indicating means mounted on said head for indicating the distance the thread cutting tool is projecting into the workpiece to thereby indicate the depth of the thread cut on said workpiece.

* * * * *